Dec. 8, 1942.  N. E. BROOKE  2,304,147
RAKE
Filed May 13, 1942
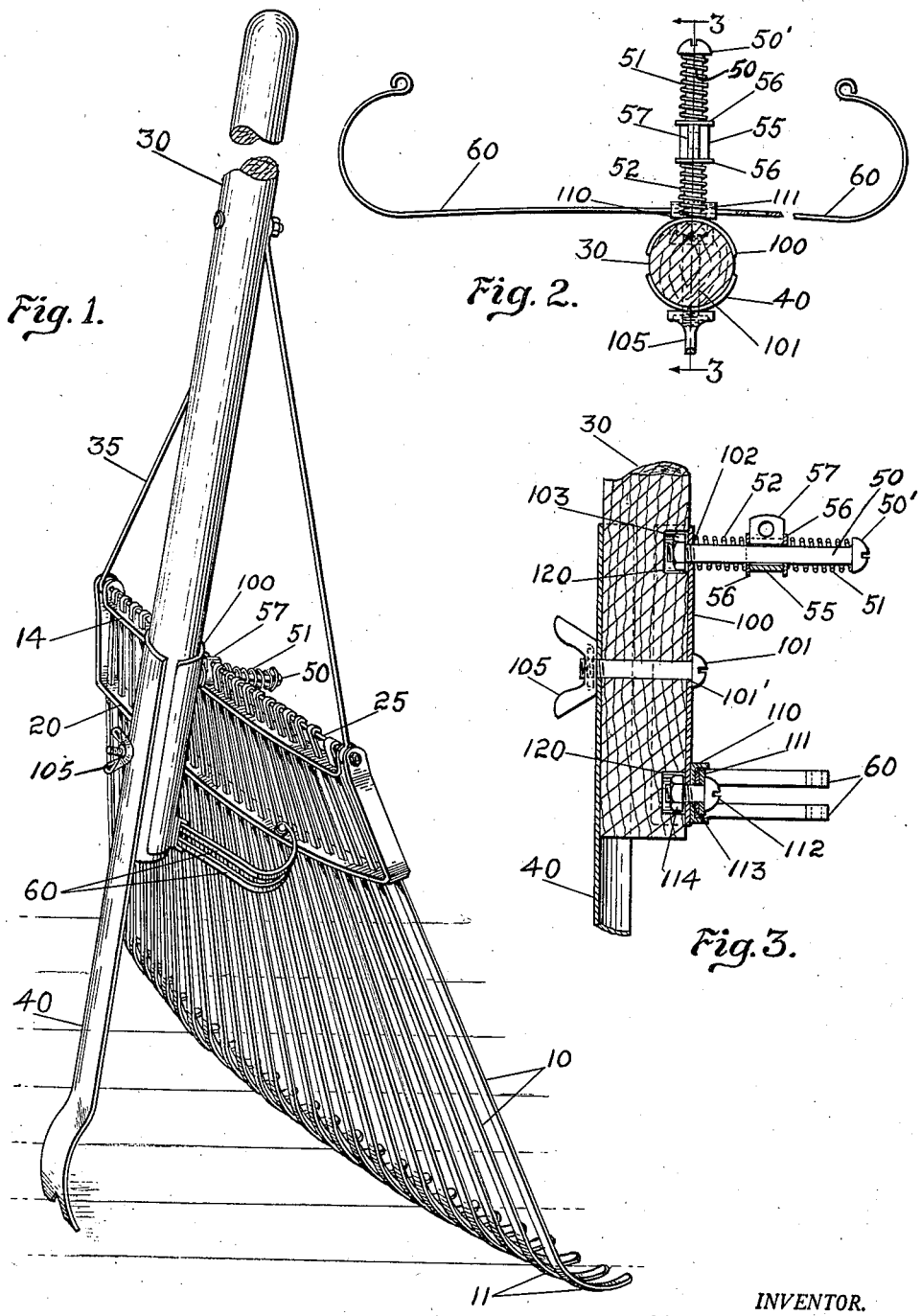
INVENTOR.
Norman E. Brooke.
BY Henry E. Stauffer
His Attorney.

Patented Dec. 8, 1942

2,304,147

UNITED STATES PATENT OFFICE 2,304,147

RAKE

Norman E. Brooke, Washington, D. C.

Application May 13, 1942, Serial No. 442,808

4 Claims. (Cl. 56—400.17)

This invention is an improvement in rakes of the so-called broom type, and particularly in such rakes as are shown and described in my United States Patent No. 2,268,066, granted December 30, 1941.

This improvement relates more particularly to the construction by which the rake head is fastened on, and secured to, the rake handle. In this improved construction the springs by which the rake head is secured in position are not fastened directly to the handle, as in the patent referred to, but are attached to a special plate, which, in turn, is then fastened to the handle. This makes it possible to secure the rake head to the handle by a single fastening means, which may be easily attached and removed. Also, this arrangement makes it practicable to easily attach and remove the cutter designed for use in connection with these rakes, when such cutter is used, for the same means which is employed to secure the rake head to the handle can be used to also securely hold the cutter blade in position.

In order to clearly understand this new construction, reference is made to the accompanying drawing, wherein:

Fig. 1 is a perspective view of the rake with the head secured to the handle by my improved fastening means, and with the cutter in position;

Fig. 2 is an enlarged plan view of the special fastening means, and the attached parts;

Fig. 3 is a sectional elevation of the fastening plate shown in Fig. 2, and illustrating the details of the construction, taken on line 3—3 of Fig. 2.

Referring to the several figures of the accompanying drawing, the reference characters are the same, as far as practicable, as those employed in my said patent, No. 2,268,066, to indicate the same parts. The rake tines are numbered 10 and the handle 30; and the tines have their ends bent as at 11 for gathering purposes. And the bridles 14 and 20 are the same as the bridles thus numbered in the earlier patent referred to.

Both sides of the rake head are spring mounted, somewhat as in Fig. 5 of my said Patent No. 2,268,066; but instead of the springs being secured directly to the handle, as in the patent, they are here fastened to a plate, as the plate 100, and the plate then secured to the handle. Preferably, the plate is shaped to fit the handle more or less closely, so that the sides thereof embrace the handle, thereby preventing the plate from turning on the handle, as best shown in Figs. 2 and 3 of the drawing.

Referring further to the accompanying drawing, both the front springs 60 and the rear springs 51 and 52 are shown as mounted on the plate 100, and the plate itself secured to the handle by the single bolt 101. Any other fastening means of course may be used.

The front springs 60, of which two are here shown, are fastened to the plate 100 by a clamp, consisting of the seat 110, and the clamping plate 111, best shown in Fig. 3. A bolt 112, which passes through the hole 113, and which is provided with a nut 114 on the inner side of the plate 100, holds the seat 110 and the clamping plate 111 in position, thus securing the springs 60 to the plate 100.

The springs for the rear of the head, 51 and 52, are mounted somewhat as in the patent referred to; but, instead of being mounted on a pin or bolt which passes through the handle, as in the patent, this rod 50 having a head or equivalent stop 50' is mounted in the plate for free movement, as will now be described.

With the construction shown in the patent, it has been found that at times there is an undue strain on the pin or rod, and the same is liable to break where the pin or bolt enters the wood of the handle. To overcome this, in my new construction the pin or rod 50 passes rather loosely through the opening 102 in the plate 100, and is provided with a head or nut 103. This latter rests against the inside of the plate 100, and because of the loose fit of the parts, may rock on the inside surface of the plate. This permits free but limited movement of the pin in all directions, and so avoids the tendency to rupture or break. In fact, the motion of the head on the plate forms, in a sense, a universal mounting of this element.

The plate 100 is fastened to the rake handle 30 by a bolt 101, which passes through a hole 101' therein and through the handle 30. A wing nut, or other fastening means 105, holds the plate 100 to the handle 30.

This method of mounting the springs makes it possible to secure all of them, and the mounting plate 100 as well, to the handle by the use of a single bolt and nut.

If the weed cutter 40 is used, the method of attaching the parts here described also makes it possible to easily attach and remove the same; for the cutter blade is provided with, in this arrangement, a single orifice through which the bolt 101 readily passes, so that a screwing down of the nut 105 will hold the cutter in position.

In order that the rake handle may rest properly in the plate 100, recesses 120 are formed therein to accommodate the nuts 103 and 114.

As here shown, the cutter 40 is of a length such that the rake may be stood upright on the end of this cutter and the bent ends 11 of the tines 10, as fully explained in my said Patent No. 2,268,066. This is fully described and claimed in that patent, and therefore forms no part of my present invention; but the exact method of attaching the cutter is somewhat different from that used in said earlier patent.

The tine rod 25 is the same as that numbered 25 in my said Patent No. 2,268,066. It is here shown as passing through a hole in the bracket 57 of the sleeve 55. The function of this rod is the same as that of the rod 25 in the said patent, and so need not be described in detail. It is sufficient to say that the sleeve 55, by the extension 57 thereon, is pivoted on the rod 25 to oscillate thereon as the sleeve moves up and down on the pin or rod 50. Washers 56 above and below the sleeve 55 prevent the springs 51 and 52 slipping into the opening in the sleeve.

The brace 35 is the usual support between the handle 30 and the rake head and gives the rake head lateral support. It is for the same purpose, and serves the same function, as the brace 35 of my patent above referred to.

Having thus described by invention, what I claim is:

1. In a rake, the combination of a handle, a rake head having a front portion and a rear portion arranged beside the handle and in overlapping relation with respect thereto, a holding fixture partly embracing the handle and holding the rake head to the handle, means securing the front of the rake head to the holding fixture, means securing the rear of the rake head to the holding fixture, and means holding the fixture to the handle.

2. In a rake, the combination of a rake handle, a rake head having a front portion and a rear portion arranged beside the handle and in overlapping relation thereto, a holding fixture partly embracing the handle for securing the rake head to the handle, means securing the front of the rake head to the holding fixture, means securing the rear of the rake head to the holding fixture, an attaching device passing through the holding fixture and the handle of the rake securing the holding fixture in embracing relation to the handle and against rotation thereon.

3. A fixture for securing a rake head having front and rear mounting springs and a tine holding rod to a suitable handle, comprising an elongated plate of a cross section adapted to embrace the handle, a clamp for securing the handle, a pin or rod having a head on its outer end also mounted in the plate for universal movement therein, a sleeve on the pin or rod, two spiral springs, one between the sleeve and the plate and the other between the sleeve and a head on the end of the pin or rod, an extension on the pin sleeve having a hole therein, through which the tine rod passes and around which it may oscillate slightly, substantially as described.

4. In a rake, the combination of a handle, a rake head including tines and a holding rod, a holding fixture by which the rake head is secured to the handle, spring means connecting the forward part of the head to the holding fixture, a pin also mounted in the holding fixture and having a lateral movement in all directions, a collar on the pin for free lateral and vertical movement thereon, a lateral projection on the collar having a transverse opening therethrough through which the tine holding rod at the rear of the rake head passes, helical springs on the pin, one between the holding fixture and the collar and the other between the collar and a head on the pin, and means for securing the fixture to the rake handle.

NORMAN E. BROOKE.